US012116919B2

(12) United States Patent
Webb et al.

(10) Patent No.: US 12,116,919 B2
(45) Date of Patent: *Oct. 15, 2024

(54) CONTROL OF SELECTIVE CATALYTIC REDUCTION IN HEAVY-DUTY MOTOR VEHICLE ENGINES

(71) Applicant: PACCAR Inc, Bellevue, WA (US)

(72) Inventors: Cynthia Chaffin Webb, Sedro-Woolley, WA (US); Charles Wayne Reinhardt Swart, Bellingham, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,648

(22) Filed: Apr. 18, 2023

(65) Prior Publication Data

US 2024/0052767 A1 Feb. 15, 2024

Related U.S. Application Data

(63) Continuation of application No. 17/737,641, filed on May 5, 2022, now Pat. No. 11,661,878, which is a
(Continued)

(51) Int. Cl.
*F01N 3/20* (2006.01)
*B01D 53/94* (2006.01)
(Continued)

(52) U.S. Cl.
CPC ......... *F01N 3/208* (2013.01); *B01D 53/9431* (2013.01); *B01D 53/9495* (2013.01);
(Continued)

(58) Field of Classification Search
CPC .......... F01N 3/208; F01N 3/28; F01N 3/2066; F01N 13/009; F01N 13/0093;
(Continued)

(56) References Cited

U.S. PATENT DOCUMENTS 5,570,576 A 11/1996 Ament et al.
5,588,291 A 12/1996 Maus et al.
(Continued)

FOREIGN PATENT DOCUMENTS

CN 106246301 B 7/2019
DE 10 2010 034707 A1 2/2012
(Continued)

*Primary Examiner* — Brandon D Lee
(74) *Attorney, Agent, or Firm* — Seed IP Law Group LLP

(57) ABSTRACT

A heavy duty truck includes a diesel engine that generates an exhaust gas flow and an exhaust after-treatment system for treatment of the exhaust gas flow. The exhaust after-treatment system includes at least one temperature sensor at an underbody SCR system within the exhaust after-treatment system and a DEF injector upstream of a close-coupled SCR system within the exhaust after-treatment system. The DEF injector is operated to inject DEF into the exhaust gas flow at a rate that varies as a function of a temperature measured by the temperature sensor.

18 Claims, 4 Drawing Sheets

Related U.S. Application Data continuation of application No. 17/002,582, filed on Aug. 25, 2020, now Pat. No. 11,352,927.

(60) Provisional application No. 63/060,532, filed on Aug. 3, 2020, provisional application No. 63/056,131, filed on Jul. 24, 2020, provisional application No. 63/054,468, filed on Jul. 21, 2020.

(51) Int. Cl.
*F01N 3/28* (2006.01)
*F01N 13/00* (2010.01)

(52) U.S. Cl.
CPC .............. *F01N 3/28* (2013.01); *F01N 3/2066* (2013.01); *F01N 13/009* (2014.06); *F01N 13/0093* (2014.06); *F01N 2570/14* (2013.01); *F01N 2590/08* (2013.01); *F01N 2610/02* (2013.01); *F01N 2610/146* (2013.01); *F01N 2900/0422* (2013.01); *F01N 2900/1404* (2013.01); *F01N 2900/1602* (2013.01)

(58) Field of Classification Search
CPC ............. F01N 2570/14; F01N 2590/08; F01N 2610/02; F01N 2610/146; F01N 2900/0422; F01N 2900/1404; F01N 2900/1602; B01D 53/9431; B01D 53/9495
See application file for complete search history.

(56) References Cited

U.S. PATENT DOCUMENTS

| | | | |
|---|---|---|---|
| 5,600,947 | A | 2/1997 | Cullen |
| 5,787,705 | A | 8/1998 | Thoreson |
| 6,125,629 | A * | 10/2000 | Patchett .............. F01N 3/2066 60/284 |
| 8,778,290 | B1 | 7/2014 | Ren et al. |
| 8,818,691 | B2 | 8/2014 | Douglas et al. |
| 10,161,276 | B2 | 12/2018 | Miao et al. |
| 10,690,033 | B1 | 6/2020 | Johnson et al. |
| 10,753,255 | B2 | 8/2020 | Schweizer |
| 10,760,513 | B1 | 9/2020 | Huhn et al. |
| 10,808,594 | B2 | 10/2020 | Dimoski et al. |
| 10,920,641 | B2 | 2/2021 | Kinnaird et al. |
| 11,035,274 | B2 | 6/2021 | Johansson et al. |
| 11,181,026 | B1 | 11/2021 | Webb et al. |
| 2004/0128983 | A1 | 7/2004 | Okada et al. |
| 2006/0153761 | A1 | 7/2006 | Bandl-Konrad et al. |
| 2007/0079605 | A1 | 4/2007 | Hu et al. |
| 2007/0082783 | A1 | 4/2007 | Hu et al. |
| 2007/0122317 | A1 | 5/2007 | Driscoll et al. |
| 2007/0193253 | A1 | 8/2007 | Tsumagari |
| 2008/0072575 | A1 | 3/2008 | Yan |
| 2008/0243358 | A1 | 10/2008 | Kojima et al. |
| 2008/0295493 | A1 | 12/2008 | Applegate et al. |
| 2009/0035194 | A1 | 2/2009 | Robel et al. |
| 2009/0158706 | A1 | 6/2009 | Sun |
| 2009/0183501 | A1 | 7/2009 | Gonze et al. |
| 2010/0242440 | A1 | 9/2010 | Garimella et al. |
| 2011/0000194 | A1 | 1/2011 | Gonze et al. |
| 2011/0047964 | A1 | 3/2011 | Yezerets et al. |
| 2011/0061372 | A1 | 3/2011 | Levijoki et al. |
| 2011/0265452 | A1 | 11/2011 | Geveci et al. |
| 2011/0271660 | A1 | 11/2011 | Gonze et al. |
| 2012/0085082 | A1 | 4/2012 | Levijoki et al. |
| 2013/0146024 | A1 | 6/2013 | Cunningham et al. |
| 2013/0232958 | A1 | 9/2013 | Ancimer et al. |
| 2013/0311065 | A1 | 11/2013 | Sun et al. |
| 2014/0033683 | A1 | 2/2014 | Wei et al. |
| 2014/0363358 | A1 | 12/2014 | Udd et al. |
| 2015/0023853 | A1 | 1/2015 | Wittrock et al. |
| 2015/0040540 | A1 | 2/2015 | Hulser et al. |
| 2015/0040543 | A1 | 2/2015 | Shetney et al. |
| 2015/0096287 | A1 | 4/2015 | Qi |
| 2015/0151251 | A1 | 6/2015 | Gaudin |
| 2015/0247435 | A1 | 9/2015 | Garimella et al. |
| 2015/0275730 | A1 | 10/2015 | Gupta et al. |
| 2015/0276694 | A1 | 10/2015 | Lahr |
| 2015/0314239 | A1 | 11/2015 | Kawaguchi et al. |
| 2015/0337702 | A1 | 11/2015 | Ettireddy et al. |
| 2016/0032803 | A1 | 2/2016 | Ettireddy et al. |
| 2016/0186629 | A1 | 6/2016 | Osburn et al. |
| 2016/0186630 | A1 | 6/2016 | Osburn et al. |
| 2016/0346732 | A1 | 12/2016 | Schmitt et al. |
| 2017/0051654 | A1 | 2/2017 | Gupta et al. |
| 2017/0114690 | A1 | 4/2017 | Gupta et al. |
| 2017/0122159 | A1 * | 5/2017 | Bahrami ............... F01N 3/2066 |
| 2017/0130629 | A1 | 5/2017 | Nagel et al. |
| 2017/0167342 | A1 | 6/2017 | Balthes |
| 2017/0175604 | A1 | 6/2017 | Devarakonda et al. |
| 2017/0234199 | A1 * | 8/2017 | Sun .......................... F01N 3/035 60/286 |
| 2017/0306819 | A1 | 10/2017 | Alfieri et al. |
| 2018/0080359 | A1 | 3/2018 | Price et al. |
| 2018/0087426 | A1 | 3/2018 | Dou et al. |
| 2018/0163589 | A1 | 6/2018 | David et al. |
| 2018/0230879 | A1 | 8/2018 | Saitoh et al. |
| 2018/0252136 | A1 | 9/2018 | Concetto Pesce et al. |
| 2018/0274420 | A1 | 9/2018 | Kleinknecht et al. |
| 2018/0274421 | A1 | 9/2018 | Smith et al. |
| 2018/0334939 | A1 | 11/2018 | Mital et al. |
| 2018/0345217 | A1 | 12/2018 | Goffe |
| 2018/0345218 | A1 | 12/2018 | Goffe |
| 2019/0078481 | A1 | 3/2019 | Schweizer |
| 2019/0155230 | A1 | 5/2019 | Culbertson et al. |
| 2019/0234367 | A1 | 8/2019 | Pursifull et al. |
| 2019/0345861 | A1 * | 11/2019 | Johansson ............... F01N 3/206 |
| 2019/0360415 | A1 | 11/2019 | Romanato |
| 2019/0383189 | A1 | 12/2019 | Dou et al. |
| 2020/0063634 | A1 | 2/2020 | Smith et al. |
| 2020/0316571 | A1 | 10/2020 | Goffe |
| 2020/0332691 | A1 | 10/2020 | Soeger et al. |
| 2021/0079826 | A1 | 3/2021 | Voss et al. |
| 2021/0095590 | A1 | 4/2021 | Bastoreala et al. |
| 2022/0010713 | A1 | 1/2022 | McCarthy, Jr. et al. |

FOREIGN PATENT DOCUMENTS

| | | |
|---|---|---|
| DE | 102018101929 A1 | 8/2019 |
| DE | 10 2018 205132 A1 | 10/2019 |
| EP | 3009622 A1 | 4/2016 |
| EP | 3581773 A1 | 12/2019 |
| WO | WO 2009031030 A2 | 3/2009 |
| WO | WO 2009123633 A1 | 10/2009 |
| WO | WO 2014032686 A1 | 3/2014 |

* cited by examiner

CONTROL OF SELECTIVE CATALYTIC REDUCTION IN HEAVY-DUTY MOTOR VEHICLE ENGINES

BACKGROUND

Technical Field

The present disclosure relates generally to control of selective catalytic reduction in heavy-duty motor vehicle engines and to modulation of performance of selective catalytic reduction systems in heavy-duty motor vehicle exhaust after-treatment systems.

Description of the Related Art

Regulated emissions from today's heavy-duty engines demand very low levels of tailpipe emissions, and standards are expected to be further reduced in the near future. To reduce tailpipe exhaust emissions, current technologies rely on aggressive engine control strategies and exhaust after-treatment catalyst systems (catalyst systems used to treat engine exhaust are referred to herein as exhaust after-treatment systems, emissions after-treatment systems, or EAS). The EAS for a typical heavy-duty diesel or other lean-burning engine may include a diesel oxidation catalyst (DOC) to oxidize unburned fuel and carbon monoxide, a diesel particulate filter (DPF) for control of particulate matter (PM), selective catalytic reduction (SCR) systems for reduction of oxides of nitrogen ($NO_x$), and/or an ammonia oxidation catalyst (AMOX). Performance of EAS systems, and of SCR systems in particular, is dependent upon exhaust gas temperature and other parameters.

SCR processes use catalysts to catalyze the $NO_x$ reduction and a fluid referred to as DEF (diesel emission fluid), which acts as a $NO_x$ reductant over the SCR catalyst. DEF is an aqueous solution that evaporates and decomposes to chemically release ammonia so that the ammonia is available for reaction. Efficiency of SCR operation is dependent upon temperature. For example, DEF evaporation and decomposition is dependent upon temperature, with higher temperatures (e.g., temperatures over 150, 160, 170, 180, 190, 200, 250, 300, or 350 degrees Celsius) generally improving performance. Temperature levels required to ensure compliance with emissions regulations may be highly dependent upon a wide variety of variables and are in some cases determined experimentally for specific engines, trucks, and operating conditions thereof. Thus, an EAS may include a heater to increase the temperature of the exhaust, to facilitate DEF injection, evaporation, and decomposition at rates sufficient to allow efficient performance of the SCR processes.

BRIEF SUMMARY

A method may be summarized as comprising: operating a diesel engine of a heavy-duty truck such that the diesel engine generates an exhaust gas flow that enters an exhaust after-treatment system of the heavy-duty truck, the exhaust after-treatment system including a close-coupled selective catalytic reduction system and an underbody selective catalytic reduction system downstream of the close-coupled selective catalytic reduction system with respect to the exhaust gas flow; monitoring a temperature of the exhaust gas flow at the underbody selective catalytic reduction system; and controlling a DEF injector upstream of the close-coupled selective catalytic reduction system to inject DEF into the exhaust gas flow at a rate that varies as a function of the monitored temperature across a range of at least 25 degrees Celsius in the monitored temperature.

Controlling the DEF injector may include controlling the DEF injector to inject DEF into the exhaust gas flow at a rate that varies as a function of the monitored temperature across a range of at least 50 degrees Celsius in the monitored temperature. Controlling the DEF injector may include controlling the DEF injector to inject DEF into the exhaust gas flow at a rate that varies as a function of the monitored temperature across a range of at least 100 degrees Celsius in the monitored temperature.

The method may further comprise controlling a DEF injector downstream of the close-coupled selective catalytic reduction system and upstream of the underbody selective catalytic reduction system to inject DEF into the exhaust gas flow at a rate that varies as a function of the monitored temperature. Controlling the DEF injector downstream of the close-coupled selective catalytic reduction system and upstream of the underbody selective catalytic reduction system may include operating the DEF injector downstream of the close-coupled selective catalytic reduction system and upstream of the underbody selective catalytic reduction system to reduce $NO_x$ levels in the exhaust gas flow to ensure compliance with emissions regulations. Controlling the DEF injector upstream of the close-coupled selective catalytic reduction system and controlling the DEF injector downstream of the close-coupled selective catalytic reduction system and upstream of the underbody selective catalytic reduction system may include optimizing a division labor of reducing $NO_x$ levels to comply with emissions regulations.

The DEF injector may inject DEF into the exhaust gas flow at a rate that decreases as the monitored temperature increases. The DEF injector may initially inject DEF into the exhaust gas flow at a rate sufficient for the close-coupled selective catalytic reduction system to reduce $NO_x$ levels to comply with emissions regulations. After the DEF injector injects DEF into the exhaust gas flow at the rate sufficient for the close-coupled selective catalytic reduction system to reduce $NO_x$ levels to comply with emissions regulations, the DEF injector may inject DEF into the exhaust gas flow at a lower rate sufficient for the close-coupled selective catalytic reduction system to reduce $NO_x$ levels halfway to compliance with emissions regulations.

The method may further comprise, while the DEF injector upstream of the close-coupled selective catalytic reduction system injects DEF into the exhaust gas flow at the rate sufficient for the close-coupled selective catalytic reduction system to reduce $NO_x$ levels halfway to compliance with emissions regulations, controlling a DEF injector downstream of the close-coupled selective catalytic reduction system and upstream of the underbody selective catalytic reduction system to inject DEF into the exhaust gas flow at a rate sufficient for the underbody selective catalytic reduction system to reduce $NO_x$ levels to comply with emissions regulations. After the DEF injector injects DEF into the exhaust gas flow at the lower rate sufficient for the close-coupled selective catalytic reduction system to reduce $NO_x$ levels halfway to compliance with emissions regulations, the DEF injector may cease to inject DEF into the exhaust gas flow. The method may further comprise, once the DEF injector upstream of the close-coupled selective catalytic reduction system ceases to inject DEF into the exhaust gas flow, controlling a DEF injector downstream of the close-coupled selective catalytic reduction system and upstream of the underbody selective catalytic reduction system to inject DEF into the exhaust gas flow at a rate sufficient for the underbody selective catalytic reduction system to reduce $NO_x$ levels to comply with emissions regulations.

The method may further comprise monitoring a $NO_x$ level upstream of the close-coupled selective catalytic reduction system. Controlling the DEF injector may include operating the DEF injector to inject DEF into the exhaust gas flow at a rate that varies as a function of the monitored $NO_x$ level. Controlling the DEF injector may include operating the DEF injector to inject DEF into the exhaust gas flow to achieve a target ammonia-to-$NO_x$ ratio in the close-coupled selective catalytic reduction system.

A method may be summarized as comprising: operating a diesel engine of a heavy-duty truck such that the diesel engine generates an exhaust gas flow that enters an exhaust after-treatment system of the heavy-duty truck, the exhaust after-treatment system including a close-coupled selective catalytic reduction system and an underbody selective catalytic reduction system downstream of the close-coupled selective catalytic reduction system with respect to the exhaust gas flow; monitoring a temperature of the exhaust gas flow at the underbody selective catalytic reduction system; and controlling a DEF injector upstream of the close-coupled selective catalytic reduction system to inject DEF into the exhaust gas flow at a rate that varies as a function of the monitored temperature over a span of time of at least thirty seconds, at least one minute, or at least two minutes.

A heavy-duty truck may be summarized as comprising: a diesel engine; an exhaust after-treatment system having an upstream end and a downstream end opposite the upstream end, the upstream end coupled to the diesel engine, the exhaust after-treatment system including a close-coupled selective catalytic reduction system and an underbody selective catalytic reduction system downstream of the close-coupled selective catalytic reduction system; and an engine control unit configured to: operate the diesel engine such that the diesel engine generates an exhaust gas flow that enters the exhaust after-treatment system; monitor a temperature of the exhaust gas flow at the underbody selective catalytic reduction system; and control a DEF injector upstream of the close-coupled selective catalytic reduction system to inject DEF into the exhaust gas flow at a rate that varies as a function of the monitored temperature across a range of at least 25 degrees Celsius in the monitored temperature. The engine control unit may be configured to control the DEF injector to inject DEF into the exhaust gas flow to achieve a target ammonia-to-$NO_x$ ratio in the close-coupled selective catalytic reduction system.

DETAILED DESCRIPTION

Figure 1:
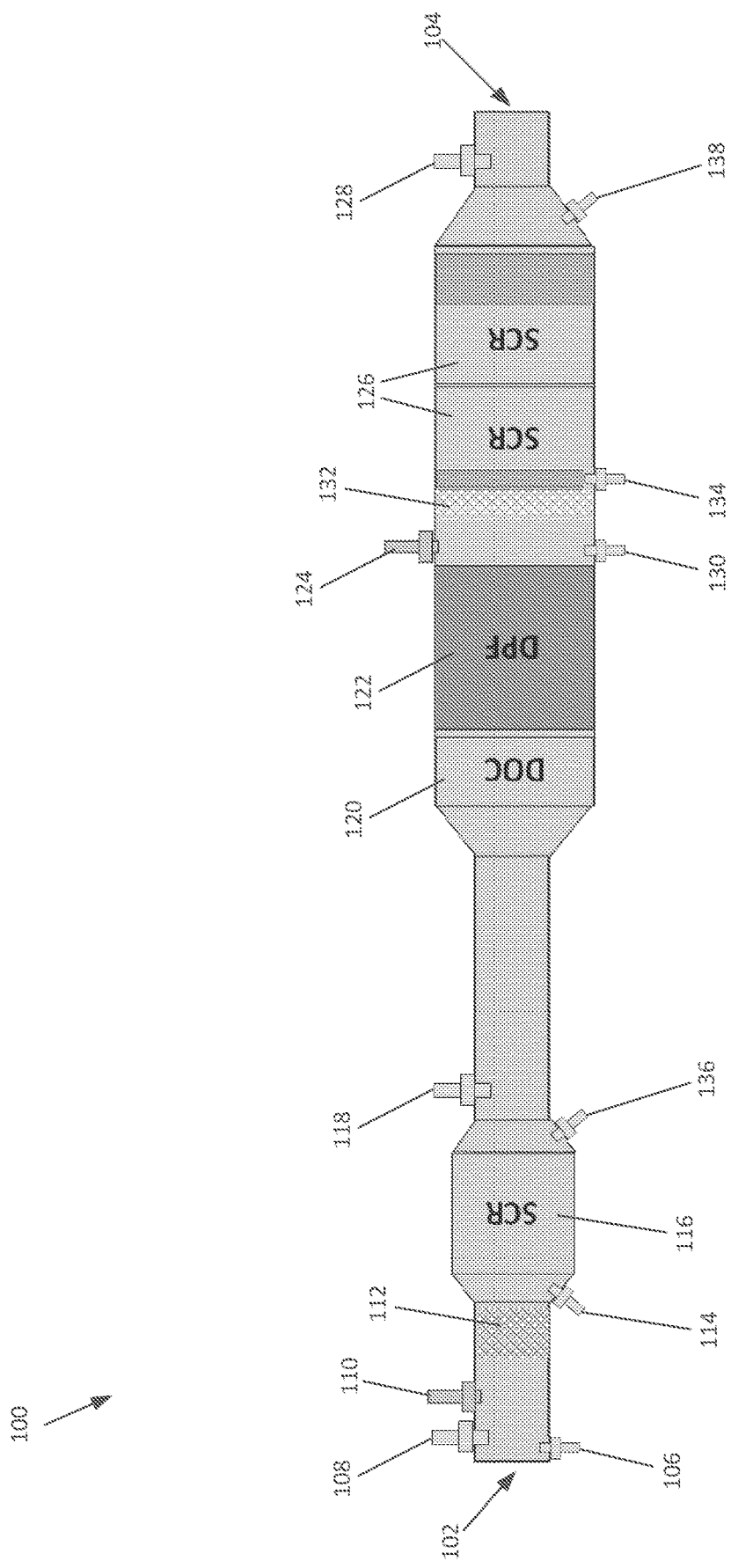
FIG. 1 illustrates a diagram of an exhaust after-treatment system including a DOC, a DPF, and dual SCR systems.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The use of ordinals such as first, second and third does not necessarily imply a ranked sense of order, but rather may only distinguish between multiple instances of an act or structure.

Terms of geometric alignment may be used herein. Any components of the embodiments that are illustrated, described, or claimed herein as being aligned, arranged in the same direction, parallel, or having other similar geometric relationships with respect to one another have such relationships in the illustrated, described, or claimed embodiments. In alternative embodiments, however, such components can have any of the other similar geometric properties described herein indicating alignment with respect to one another. Any components of the embodiments that are illustrated, described, or claimed herein as being not aligned, arranged in different directions, not parallel, perpendicular, transverse, or having other similar geometric relationships with respect to one another, have such relationships in the illustrated, described, or claimed embodiments. In alternative embodiments, however, such components can have any of the other similar geometric properties described herein indicating non-alignment with respect to one another.

Various examples of suitable dimensions of components and other numerical values may be provided herein. In the illustrated, described, and claimed embodiments, such dimensions are accurate to within standard manufacturing tolerances unless stated otherwise. Such dimensions are examples, however, and can be modified to produce variations of the components and systems described herein. In various alternative embodiments, such dimensions and any other specific numerical values provided herein can be approximations wherein the actual numerical values can vary by up to 1, 2, 5, 10, 15 or more percent from the stated, approximate dimensions or other numerical values.

As described herein, experiments may be performed and measurements may be taken while an engine or a vehicle including an engine are operating at "steady state." As used herein, the term "steady state" may mean that the engine or the vehicle including the engine are operating with all operating parameters, including engine speed, power level, etc., unchanged or substantially unchanged over a period of time of at least one, at least two, at least three, at least four, at least five, at least six, or at least ten seconds.

Traditionally, heavy-duty vehicles included many components of exhaust after-treatment systems "underbody," that is, underneath the engine, cab, or another portion of the vehicle, where space is relatively freely available and these components can therefore generally be larger than would otherwise be practical. Some modern heavy-duty vehicles, however, have begun to include a "close-coupled," "up-close," or "light-off" SCR unit much closer to the engine and exhaust ports thereof (e.g., adjacent to a turbine outlet of a turbocharger) and upstream of the traditional underbody exhaust after-treatment system, which can provide certain advantages in that the temperature of the engine exhaust may be higher when it is closer to the engine, although locating an SCR unit nearer the engine limits the available space and thus its practical size. Thus, some modern heavy-duty vehicles have included both a "close-coupled" SCR unit upstream with respect to the flow of the exhaust, such as adjacent to a turbine outlet of a turbocharger, to take advantage of the higher exhaust temperatures, as well as an "underbody" SCR unit downstream with respect to the flow of the exhaust, such as under the engine or cab of the vehicle, to take advantage of the greater available space.

FIG. 1 illustrates a diagram of an exhaust after-treatment system 100 that has a first, upstream end 102 and a second, downstream end 104 opposite to the first, upstream end 102. The exhaust after-treatment system 100 is a component of a vehicle, such as a large, heavy-duty, diesel truck, and in use carries exhaust from the diesel engine of the truck to a tailpipe of the truck. For example, the first, upstream end 102 of the exhaust after-treatment system 100 may be coupled directly to an exhaust port or an outlet port of the diesel engine, such as a turbine outlet of a turbocharger thereof, and the second, downstream end 104 may be coupled directly to an inlet port of a tailpipe or muffler of the truck. Thus, when the engine is running and generating exhaust, the exhaust travels along the length of the exhaust after-treatment system 100 from the first, upstream end 102 thereof to the second, downstream end 104 thereof.

As illustrated in FIG. 1, the exhaust after-treatment system 100 includes, at its first, upstream end 102, or proximate or adjacent thereto, a first temperature sensor 106, which may be a thermocouple, to measure the temperature of the exhaust gas flow as it leaves the engine and enters the exhaust after-treatment system 100, before heat begins to be lost through the exhaust after-treatment system 100 to the environment. The exhaust after-treatment system 100 also includes, at its first, upstream end 102, or proximate or adjacent thereto, or just downstream of the first temperature sensor 106, a first $NO_x$ sensor 108, to measure the content of $NO_x$ gases in the exhaust gas flow as it leaves the engine and enters the exhaust after-treatment system 100. The exhaust after-treatment system 100 also includes, at its first, upstream end 102, or proximate or adjacent thereto, or just downstream of the first $NO_x$ sensor 108, a first DEF injector 110, to inject DEF into the exhaust gas flow as it leaves the engine and enters the exhaust after-treatment system 100.

The exhaust after-treatment system 100 may also include, proximate or adjacent its first, upstream end 102, or just downstream of the first DEF injector 110, a first heater 112, which may be an electrically-powered resistive heater or heating element, a burner, or any other suitable heater, to inject heat energy into the exhaust gas flow and the injected DEF as they flow through the exhaust after-treatment system 100. The exhaust after-treatment system 100 also includes, just downstream of the first heater 112, a second temperature sensor 114, which may be a thermocouple, to measure the temperature of the exhaust gas flow as it leaves the first heater 112 and just before or just as it enters a first, close-coupled SCR system 116, or at the inlet to the close-coupled SCR system 116. The exhaust after-treatment system 100 also includes, just downstream of the first heater 112 and the second temperature sensor 114, the first, close-coupled SCR system 116, which is configured to reduce oxides of nitrogen ($NO_x$) in the exhaust gas flow.

The exhaust after-treatment system 100 also includes, just downstream of the first SCR system 116, a third temperature sensor 136, which may be a thermocouple, to measure the temperature of the exhaust gas flow as it leaves the first SCR system 116. In some implementations, the second temperature sensor 114 and the third temperature sensor 136 may be collectively referred to as an SCR bed temperature sensor. For example, a temperature of a catalytic bed of the first, close-coupled SCR system 116 may be measured, calculated, estimated, or otherwise determined based on the measurements provided by the second temperature sensor 114 and the third temperature sensor 136, such as by averaging the temperature measurements provided by the second temperature sensor 114 and the third temperature sensor 136.

The exhaust after-treatment system 100 also includes, just downstream of the first SCR system 116 and/or the third temperature sensor 136, a second $NO_x$ sensor 118, to measure the content of $NO_x$ gases in the exhaust gas flow as it leaves the first SCR system 116. In practice, the first $NO_x$ sensor 108 and the second $NO_x$ sensor 118 can be used together to monitor, assess, or measure the performance of the first SCR system 116. Together, the first temperature sensor 106, the first $NO_x$ sensor 108, the first DEF injector 110, the first heater 112, the second temperature sensor 114, the first, close-coupled SCR system 116, the third temperature sensor 136, and the second $NO_x$ sensor 118 can be referred to as a close-coupled portion of the exhaust after-treatment system 100, as they can be collectively located at or adjacent to the engine of the vehicle.

The exhaust after-treatment system 100 also includes, downstream of the first SCR system 116, the third temperature sensor 136, and the second $NO_x$ sensor 118, a DOC component 120, to oxidize unburned fuel and carbon monoxide in the exhaust gas flow. The exhaust after-treatment system 100 also includes, downstream of the DOC component 120, a DPF 122, to reduce or otherwise control particulate matter in the exhaust gas flow. The exhaust after-treatment system 100 also includes, downstream of the DPF 122, a fourth temperature sensor 130, which may be a thermocouple, to measure the temperature of the exhaust gas flow as it leaves the DPF 122. The exhaust after-treatment system 100 also includes, downstream of the DPF 122, or just downstream of the fourth temperature sensor 130, a second DEF injector 124, to inject DEF into the exhaust gas flow as it leaves the DPF 122.

In some embodiments, the exhaust after-treatment system 100 may also include, just downstream of the fourth temperature sensor 130 and the second DEF injector 124, a mixer 132 and a second heater, which may be an electrically-powered resistive heater or heating element, a burner, or any other suitable heater, to inject heat energy into the exhaust gas flow and the injected DEF as they flow through the exhaust after-treatment system 100. The exhaust after-treatment system 100 also includes, just downstream of the mixer 132 and the second heater, a fifth temperature sensor 134, which may be a thermocouple, to measure the temperature of the exhaust gas flow as it leaves the second heater and just before or just as it enters a second, underbody SCR system 126, or at the inlet to the underbody SCR system 126. The exhaust after-treatment system 100 also includes, just downstream of the mixer 132, the second heater, and the fifth temperature sensor 134, the second, underbody SCR system 126, which is configured to reduce oxides of nitrogen ($NO_x$) in the exhaust gas flow.

The exhaust after-treatment system 100 also includes, just downstream of the second SCR system 126, a sixth temperature sensor 138, which may be a thermocouple, to measure the temperature of the exhaust gas flow as it leaves the second SCR system 126. In some implementations, the fifth temperature sensor 134 and the sixth temperature sensor 138 may be collectively referred to as an SCR bed temperature sensor. For example, a temperature of a catalytic bed of the second, underbody SCR system 126 may be measured, calculated, estimated, or otherwise determined based on the measurements provided by the fifth temperature sensor 134 and the sixth temperature sensor 138, such as by averaging the temperature measurements provided by the fifth temperature sensor 134 and the sixth temperature sensor 138.

In some alternative embodiments, the exhaust after-treatment system 100 may not include the second heater and may include only a single heater, i.e., the first heater 112, to reduce overall costs. Similarly, in some embodiments, the exhaust after-treatment system 100 may not include all of the temperature sensors described herein, such as the third temperature sensor 136, fourth temperature sensor 130, fifth temperature sensor 134, and/or sixth temperature sensor 138, such as to further reduce overall costs. In such implementations, such temperature sensors may be replaced by virtual temperature sensors, which may measure, calculate, estimate, simulate, or otherwise determine a temperature at the same location, such as based on equations, data, simulations, and/or models of the behavior of temperatures at such locations under the operating conditions of the systems described herein.

The exhaust after-treatment system 100 also includes, just downstream of the second SCR system 126 and/or the sixth temperature sensor 138, and at its second, downstream end 104, or proximate or adjacent thereto, a third $NO_x$ sensor 128, to measure the content of $NO_x$ gases in the exhaust gas flow as it leaves the second SCR system 126. In practice, the second $NO_x$ sensor 118 and the third $NO_x$ sensor 128 can be used together to monitor, assess, or measure the performance of the second SCR system 126. Together, the DOC component 120, the DPF 122, the second DEF injector 124, the fourth temperature sensor 130, the mixer 132, the second heater, the fifth temperature sensor 134, the second SCR system 126, the sixth temperature sensor 138, and the third $NO_x$ sensor 128 can be referred to as an underbody portion of the exhaust after-treatment system 100, as they can be collectively located underneath the engine, cab, or another portion of the vehicle.

As noted previously, performance of exhaust after-treatment systems, and of SCR systems in particular, is dependent upon exhaust gas temperature. More specifically, DEF evaporation and decomposition is dependent upon temperature, with higher temperatures generally improving performance. Thus, operation of a heater to increase the temperature of the exhaust gas flow can be critical to maintaining compliance with emissions regulations. Nevertheless, operation of a heater to increase the temperature of the exhaust gas flow naturally incurs a fuel penalty and thus a reduction of overall system fuel efficiency. Thus, it is critical to ensure accurate and precise performance of such heaters, to ensure compliance with emissions standards without unduly reducing overall fuel efficiency.

There are additional trade-offs involved in relying on the close-coupled SCR system 116 and/or the underbody SCR system 126 to reduce $NO_x$ levels in the exhaust gas flow. For example, as noted previously, use of the close coupled SCR system 116 may be advantageous because the exhaust gas flow is ordinarily already naturally at a higher temperature than it is at the underbody SCR system 126 (ignoring operation of the first heater 112 and/or the second heater), particularly under cold-start conditions and/or low load operation. Nevertheless, as also noted previously, the underbody SCR system 126 may be larger than the close-coupled SCR system 116.

Furthermore, relative weighting of the burden of $NO_x$ reduction between the close-coupled SCR system 116 and the underbody SCR system 126 results in different levels of various tailpipe emissions. $NO_x$ (oxides of nitrogen) in the exhaust gas flow include both NO (nitric oxide) and $NO_2$ (nitrogen dioxide), but diesel engine exhaust typically includes $NO_x$ predominantly in the form of NO rather than $NO_2$. As the exhaust gas flow passes across the DOC 120, however, NO is oxidized to $NO_2$, and as such, the underbody SCR system 126 has higher levels of $NO_2$ than the close-coupled SCR system 116. As such, the close-coupled SCR system 116 is more heavily governed by the standard SCR reaction and other NO-based reactions than the underbody SCR system 126. Under cold conditions (e.g., SCR bed temperatures under 250 degrees Celsius), dosing of DEF in the presence of $NO_2$ can form nitrates, which subsequently form $N_2O$, which is a greenhouse gas. Under conditions when the underbody SCR system 126 is cold, therefore, it can be preferable to leverage the close-coupled SCR system 116. The control strategy therefore heavily weights operation of the close-coupled SCR system 116 relative to operation of the underbody SCR system 126 under cold-start and low-load operation conditions.

Additionally, the DPF 122 includes a catalyst that traps soot (e.g., black carbon) from the exhaust gas flow. The DPF 122 has a maximum capacity that, once reached, requires active regeneration of the DPF 122 to oxidize the soot to $CO_2$. Active regeneration is achieved by raising the temperature of the exhaust to greater than 500 degrees Celsius, and therefore increases both fuel consumption and $CO_2$ emissions. Under warm conditions (e.g., exhaust temperature greater than 300 degrees Celsius), the soot in the DPF 122 can undergo passive regeneration using $NO_2$ generated by the DOC 120. It is desirable to maximize passive regeneration (soot oxidation) in the DPF 122 to reduce, minimize, avoid, or optimize reliance on active regeneration. Therefore, under warm conditions, the dual SCR control strategy shifts the burden of $NO_x$ reduction toward the underbody SCR system 126, to increase, maximize, or optimize the amount of $NO_2$ delivered to the DPF 122.

Finally, overall SCR conversion efficiency can suffer under high exhaust flow conditions such as at high load operation and hard acceleration conditions of the diesel engine. To improve overall system $NO_x$ reduction efficiency under such conditions, or decrease the degree to which such efficiency suffers, the close-coupled SCR 116 and the underbody SCR 126 may both be used at or near their respective maximum capacities, under which conditions the close-coupled SCR system 116 may be considered additional volume to the underbody SCR system 126. That is, under some conditions, irrespective of the temperature operating regime, the close-coupled SCR system 116 is leveraged to reduce the effective $NO_x$ flow into the underbody SCR system 126, to reduce high exhaust flow emissions.

Thus, at some times during operation of a diesel engine, only the close-coupled SCR system 116 may be used to reduce $NO_x$ levels to comply with tailpipe emissions regulations, while at other times during operation of a diesel engine, only the underbody SCR system 126 may be used to reduce $NO_x$ levels to comply with tailpipe emissions regulations, while at yet other times, the burden of reducing $NO_x$ levels to comply with tailpipe emissions regulations may be shared by the two SCR systems 116, 126, such as by any suitable ratio.

For example, the close coupled SCR system 116 may reduce $NO_x$ levels by 10%, 25%, 50%, 75%, or 90% (or any other intermediate percentage) of the amount required to comply with tailpipe emissions regulations, while the underbody SCR system 126 may reduce $NO_x$ levels by a complementary amount (e.g., 90%, 75%, 50%, 25%, or 10%, respectively) of the amount required to comply with tailpipe emissions regulations. Thus, it has been found that it is also valuable to balance the $NO_x$ reduction burden between the two SCR systems 116 and 126 to further improve efficiency of operation, to ensure compliance with emissions standards without unduly reducing overall fuel efficiency, and to increase, maximize, or optimize $NO_x$ reduction per unit DEF utilized.

First, an initial lookup table or database is built or populated under ideal or idealized conditions in accordance with standardized laboratory experiments. Such experiments may operate a heavy-duty diesel engine at steady state under a variety of operating conditions to determine properties of the exhaust gas flow generated by the engine at steady state under such conditions. For example, for each set of given operating conditions, the experiments may measure a mass flow rate ($\dot{m}_{exh}$) of the exhaust gas flow generated by the engine, which may be specified in units such as kg/s, determine a resulting molar specific heat at constant pressure ($C_p$) of the exhaust gas flow generated by the engine (which may be unique to each individual engine but may be expected to be constant over the range of operation of any given engine), and measure a resulting exhaust temperature ($T_1$) of the exhaust gas flow generated by the engine immediately adjacent to an exhaust port or outlet port of the engine itself, such as a turbine outlet of a turbocharger thereof, which may be measured by the first temperature sensor 106 and may be specified in units such as K or degrees Celsius.

Such experiments may also operate the diesel engine in combination with the exhaust after-treatment system 100 at steady state under a variety of operating conditions to determine how the operation of the exhaust after-treatment system 100 affects properties of the exhaust gas flow as it travels through the exhaust after-treatment system 100 at steady state under such conditions. For example, for each set of given operating conditions, the experiments may use the temperature sensors 106, 114, 130, 134, 136, and 138 to measure the temperature of the exhaust gas flow at the locations of the temperature sensors 106, 114, 130, 134, 136, and 138, respectively. The resulting measured temperatures can be stored in the lookup table or database.

As another example, for each set of given operating conditions, the experiments may use the first $NO_x$ sensor 108 to measure $NO_x$ levels at the location of the first $NO_x$ sensor 108, may use the second $NO_x$ sensor 118 to measure $NO_x$ levels at the location of the second $NO_x$ sensor 118, and may use such measurements to calculate a percentage reduction in $NO_x$ levels between the first and second $NO_x$ sensors 108, 118, which may be taken as a percentage efficiency of the close coupled SCR system 116. Thus, as noted elsewhere herein, the first $NO_x$ sensor 108 and the second $NO_x$ sensor 118 can be used together to monitor, assess, or measure the performance of the first SCR system 116 at steady state under the various experimental conditions. Similarly, for each set of given operating conditions, the experiments may use the second $NO_x$ sensor 118 to measure $NO_x$ levels at the location of the second $NO_x$ sensor 118, may use the third $NO_x$ sensor 128 to measure $NO_x$ levels at the location of the third $NO_x$ sensor 128, and may use such measurements to calculate a percentage reduction in $NO_x$ levels between the second and third $NO_x$ sensors 118, 128, which may be taken as a percentage efficiency of the underbody SCR system 126. Thus, as noted elsewhere herein, the second $NO_x$ sensor 118 and the third $NO_x$ sensor 128 can be used together to monitor, assess, or measure the performance of the second SCR system 126 at steady state under the various experimental conditions. The resulting measured $NO_x$ levels and calculated percentage efficiencies of the SCR systems can be stored in the lookup table or database. In some implementations, the resulting measured $NO_x$ levels and calculated percentage efficiencies of the SCR systems can be stored in the lookup table or database as a function of or otherwise correlated with or related to the measured temperatures.

As another example, for each set of given operating conditions, the experiments may monitor the rate at which the first and second DEF injectors 110, 124 inject DEF into the exhaust gas flow, and may use such information in combination with the measurements provided by the first, second, and third $NO_x$ sensors 108, 118, and 128, to calculate ammonia-to-$NO_x$ ratios (ANR) at the close-coupled SCR system 116 and at the underbody SCR system 126. The injection rates and calculated ANRs can be stored in the lookup table or database.

As another example, for each set of given operating conditions, the experiments may monitor the rate at which $N_2O$ is generated and emitted, as well as the state of the DPF 122, the level of passive regeneration thereof that occurs, and the degree to which active regeneration thereof is or would be required. Such information can be stored in the lookup table or database.

Based on such measurements, calculations, and data stored in the lookup table or database, ideal, optimal, efficient, or most efficient relative divisions of the labor or burden of reducing $NO_x$ levels to comply with tailpipe emissions regulations between the first, close-coupled SCR 116 and the second, underbody SCR 126 may be determined. For example, it may be determined that it is efficient to allocate the $NO_x$ reduction burden between the close-coupled SCR 116 and the underbody SCR 126 based on the temperature of the catalytic bed of the underbody SCR 126, such as based on the temperatures of the exhaust gas flow measured by the fifth temperature sensor 134 and/or the sixth temperature sensor 138 (e.g., an average thereof).

For example, it may be determined that it is more efficient to allocate a larger portion of the $NO_x$ reduction burden, or even all of the $NO_x$ reduction burden, to the close-coupled SCR 116 when the temperatures at the underbody SCR 126 are relatively cold (indicating, for example, that the diesel engine and/or the exhaust after-treatment system 100 are cold or just starting up), and to allocate a larger portion of the $NO_x$ reduction burden, or even all of the $NO_x$ reduction burden, to the underbody SCR 116 when such temperatures are relatively hot (indicating, for example, that the diesel engine and/or the exhaust after-treatment system 100 are hot or operating at or near steady-state).

In some embodiments, dividing the labor of reducing $NO_x$ levels to comply with tailpipe emissions regulations includes controlling a rate at which the first DEF injector 110 injects DEF into the exhaust gas flow upstream of the close-coupled SCR system 116 (e.g., as a function of the $NO_x$ levels measured by the first $NO_x$ sensor 108) to control an ANR within the close-coupled SCR system 116 and/or to prevent ammonia slip from the close-coupled SCR system 116, thereby controlling operation and SCR reduction efficiency of the close-coupled SCR system 116, and operating the second DEF injector 124, the second heater, and the second, underbody SCR system 126 to further reduce $NO_x$ levels to ensure compliance with emissions regulations.

As one specific example, it may be determined that when the temperature of the catalytic bed of the underbody SCR system 126 is 200 degrees Celsius or lower, it is most efficient from a systemic perspective to operate the first DEF injector 110 to inject DEF into the exhaust gas flow at a minimum rate sufficient to ensure that the ANR in the first, close-coupled SCR is equal to or 100% of the ANR required to reduce $NO_x$ levels in the exhaust gas flow just downstream of the close-coupled SCR system 116 (e.g., as measured by the second $NO_x$ sensor 118) to levels in compliance with emissions regulations, that is, such that the first, close coupled SCR system 116 handles the full $NO_x$ reduction burden, and to not begin operating the second DEF injector 124, the second heater, and the underbody SCR system 126. It may further be determined that when the temperature of the catalytic bed of the underbody SCR system 126 is 225 degrees Celsius, it is most efficient from a systemic perspective to operate the first DEF injector 110 to inject DEF into the exhaust gas flow at a minimum rate sufficient to ensure that the ANR in the first, close-coupled SCR is 80% of the ANR required to reduce $NO_x$ levels in the exhaust gas flow just downstream of the close-coupled SCR system 116 (e.g., as measured by the second $NO_x$ sensor 118) to levels in compliance with emissions regulations, and to operate the second DEF injector 124, the second heater, and the second, underbody SCR system 126 to further reduce $NO_x$ levels to ensure compliance with emissions regulations.

It may further be determined that when the temperature of the catalytic bed of the underbody SCR system 126 is 275 degrees Celsius, it is most efficient from a systemic perspective to operate the first DEF injector 110 to inject DEF into the exhaust gas flow at a minimum rate sufficient to ensure that the ANR in the first, close-coupled SCR is 60% of the ANR required to reduce $NO_x$ levels in the exhaust gas flow just downstream of the close-coupled SCR system 116 (e.g., as measured by the second $NO_x$ sensor 118) to levels in compliance with emissions regulations, and to operate the second DEF injector 124, the second heater, and the second, underbody SCR system 126 to further reduce $NO_x$ levels to ensure compliance with emissions regulations. It may further be determined that when the temperature of the catalytic bed of the underbody SCR system 126 is 300 degrees Celsius, it is most efficient from a systemic perspective to operate the first DEF injector 110 to inject DEF into the exhaust gas flow at a minimum rate sufficient to ensure that the ANR in the first, close-coupled SCR is 25% of the ANR required to reduce $NO_x$ levels in the exhaust gas flow just downstream of the close-coupled SCR system 116 (e.g., as measured by the second $NO_x$ sensor 118) to levels in compliance with emissions regulations, and to operate the second DEF injector 124, the second heater, and the second, underbody SCR system 126 to further reduce $NO_x$ levels to ensure compliance with emissions regulations.

It may further be determined that when the temperature of the catalytic bed of the underbody SCR system 126 reaches an upper threshold or boundary, it is most efficient from a systemic perspective to cease operating the first DEF injector 110, the first heater 112, and the close-coupled SCR system 116, and to operate the second DEF injector 124, the second heater, and the second, underbody SCR system 126 to handle the full $NO_x$ reduction burden and reduce $NO_x$ levels to ensure compliance with emissions regulations. At temperatures between those identified herein, or at temperatures between any other set of temperatures so studied or investigated in such experiments, any interpolation functions, such as a linear interpolation function, may be used to determine appropriate DEF injection rates. For example, it may further be determined by linear interpolation that when the temperature of the catalytic bed of the underbody SCR system 126 is 250 degrees Celsius, it is most efficient from a systemic perspective to operate the first DEF injector 110 to inject DEF into the exhaust gas flow at a minimum rate sufficient to ensure that the ANR in the first, close-coupled SCR is 70% of the ANR required to reduce $NO_x$ levels in the exhaust gas flow just downstream of the close-coupled SCR system 116 (e.g., as measured by the second $NO_x$ sensor 118) to levels in compliance with emissions regulations, and to operate the second DEF injector 124, the second heater, and the second, underbody SCR system 126 to further reduce $NO_x$ levels to ensure compliance with emissions regulations. Such information can be stored in the lookup table or database.

Second, during operation of a vehicle, such as a motor vehicle such as a heavy-duty diesel truck, the exhaust after-treatment system 100, including the first, close-coupled SCR system 116 and the second, underbody SCR system 126, may be operated to ensure compliance with emissions regulations while minimizing an incurred fuel penalty resulting from operation of the components of the exhaust after-treatment system 100, including the first heater 112 and/or the second heater, as described elsewhere herein. In particular, as the truck and its engine and its engine control unit ("ECU") are operating, the engine control unit of the truck may continuously monitor how the operation of the exhaust after-treatment system 100 affects properties of the exhaust gas flow as it travels through the exhaust after-treatment system 100. For example, the ECU may continuously measure or monitor temperatures of the exhaust gas flow at the locations of the temperature sensors 106, 114, 130, 134, 136, and 138, as well as temperatures of the catalytic beds of the first and second catalytic reduction systems 116, 126.

As another example, the ECU may use the first $NO_x$ sensor 108 to measure $NO_x$ levels at the location of the first $NO_x$ sensor 108, may use the second $NO_x$ sensor 118 to measure $NO_x$ levels at the location of the second $NO_x$ sensor 118, and may use such measurements to calculate a percentage reduction in $NO_x$ levels between the first and second $NO_x$ sensors 108, 118, which may be taken as a percentage efficiency of the close-coupled SCR system 116. Similarly, the ECU may use the second $NO_x$ sensor 118 to measure $NO_x$ levels at the location of the second $NO_x$ sensor 118, may use the third $NO_x$ sensor 128 to measure $NO_x$ levels at the location of the third $NO_x$ sensor 128, and may use such measurements to calculate a percentage reduction in $NO_x$ levels between the second and third $NO_x$ sensors 118, 128, which may be taken as a percentage efficiency of the underbody SCR system 126.

As another example, the ECU may monitor the rate at which the first and second DEF injectors 110, 124 inject DEF into the exhaust gas flow, and may use such information in combination with the measurements provided by the first, second, and third $NO_x$ sensors 108, 118, and 128, to calculate ammonia-to-$NO_x$ ratios (ANR) at the close-coupled SCR system 116 and at the underbody SCR system 126.

Based on such measurements and calculations, in combination with the data stored in the lookup table or database, the engine control unit of the truck may continuously assess or determine a desired, optimal, or most efficient division of the labor of reducing $NO_x$ levels to comply with tailpipe emissions regulations between the first, close-coupled SCR 116 and the second, underbody SCR 126. For example, the engine control unit may continuously use the bed temperature of the underbody SCR system 126 in combination with the data stored in the lookup table or database to determine a desired or optimal rate at which to inject DEF into the exhaust gas flow upstream of the close-coupled SCR system 116. Such a determination may rely on interpolation between data points stored in the lookup table or database.

The engine control unit may then operate the first DEF injector 110 to inject DEF into the exhaust gas flow at that rate. The engine control unit may then operate the second DEF injector 124, the second heater, and the second, underbody SCR system 126 to further reduce $NO_x$ levels to ensure compliance with emissions regulations. The engine control unit may furthermore continually control and/or adjust or update operation of the first DEF injector 110 to inject DEF into the exhaust gas flow at a rate that varies over time, such as over at least 15 seconds, 30 seconds, one minute, two minutes, or four minutes, and as a function of an average of the temperature measurements provided by the fifth temperature sensor 134 and the sixth temperature sensor 138, such as across a range in such an average temperature of at least 25, 50, 75, 100, 125, or 150 degrees Celsius. As such operation of the first DEF injector 110 varies, the engine control unit may also continually control and/or adjust or update operation of the second DEF injector 124, the second heater, and the second, underbody SCR system 126 to further reduce $NO_x$ levels to ensure compliance with emissions regulations.

The systems and techniques described herein can facilitate continuous and simultaneous dosing of DEF onto the catalytic beds of two independent SCR systems, namely, the close-coupled SCR system 116 and the underbody SCR system 126, such as by using two independent DEF injectors, each located upstream of a respective one of the SCR systems, namely, the first DEF injector 110 and the second DEF injector 124, to increase overall systemic efficiency while maintaining compliance with $NO_x$ emissions regulations. The systems and techniques described herein can be used to reduce $NO_x$ tailpipe emissions to ultra-low levels, which may be referred to as "ultra-low $NO_x$" or "ULN" levels. Further, the systems and techniques described herein can be leveraged to reduce especially high $NO_x$ emissions, such as on hard acceleration transients, to within regulated levels. The systems and techniques described herein may include or use a minimal number of sensors, that is, the systems and techniques described herein may include or use exactly or no more than a specified number of sensors necessary for performance as described herein. The systems and techniques described herein allow efficient operation of the close-coupled SCR system 116 and/or the underbody SCR system 126 without ammonia slip, or with minimal ammonia slip, from the SCR systems 116, 126.

Figure 2:
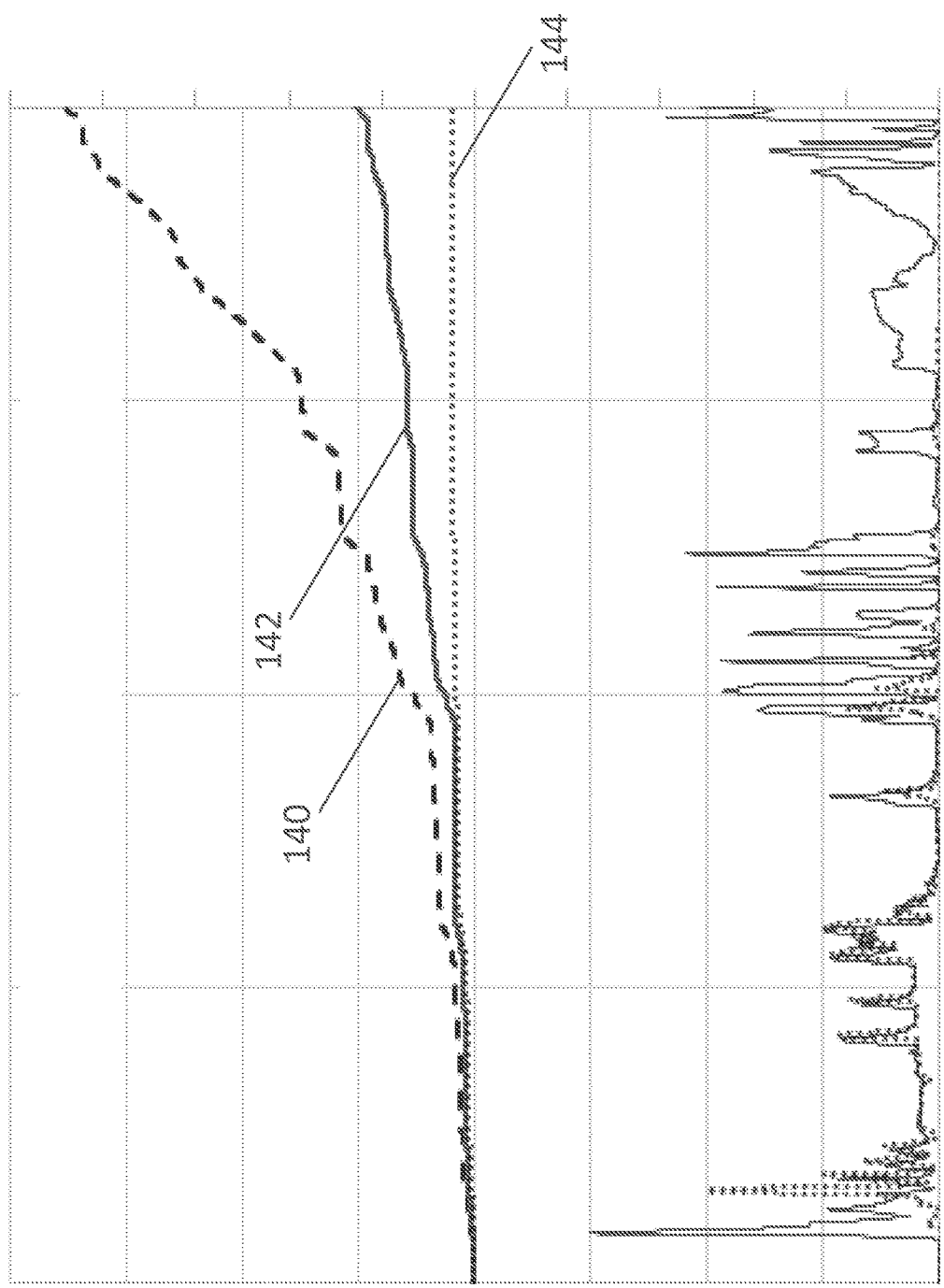
FIG. 2 illustrates results of experimental testing of a heavy-duty vehicle including a diesel engine and the exhaust after-treatment system of FIG. 1.

FIG. 2 illustrates results of experimental testing of a heavy-duty vehicle including a diesel engine and the exhaust after-treatment system 100. In particular, FIG. 2 illustrates two charts, one on top of the other. In the bottom of the two charts, the horizontal X-axis represents time and the vertical Y-axis represents the instantaneous $NO_x$ levels, in units of parts per million, measured by the first, second, and third $NO_x$ sensors 108, 118, and 128. In the top of the two charts, the horizontal X-axis represents time on the same scale and interval as in the bottom of the two charts, and the vertical Y-axis represents the cumulative $NO_x$ measured by the first $NO_x$ sensor 108 (see the line indicated by reference numeral 140), the second $NO_x$ sensor 118 (see the line indicated by reference numeral 142), and the third $NO_x$ sensor 128 (see the line indicated by reference numeral 144).

As illustrated in FIG. 2, the difference between the $NO_x$ levels measured by the first and second $NO_x$ sensors 108, 118, and the resulting difference between the cumulative $NO_x$ measured by the first and second $NO_x$ sensors 108, 118, rise early in the testing, reflecting the fact that it is generally more efficient to reduce $NO_x$ levels near start-up or at cold temperatures at the close-coupled SCR 116 than at the underbody SCR 126. As also illustrated in FIG. 2, the difference between the $NO_x$ levels measured by the second and third $NO_x$ sensors 118, 128, and the resulting difference between the cumulative $NO_x$ measured by the second and third $NO_x$ sensors 118, 128 rise later in the testing, reflecting the fact that it is generally advantageous to reduce $NO_x$ levels near steady-state operation or at hot temperatures at the underbody SCR 126 than at the close-coupled SCR 116.

Figure 3:
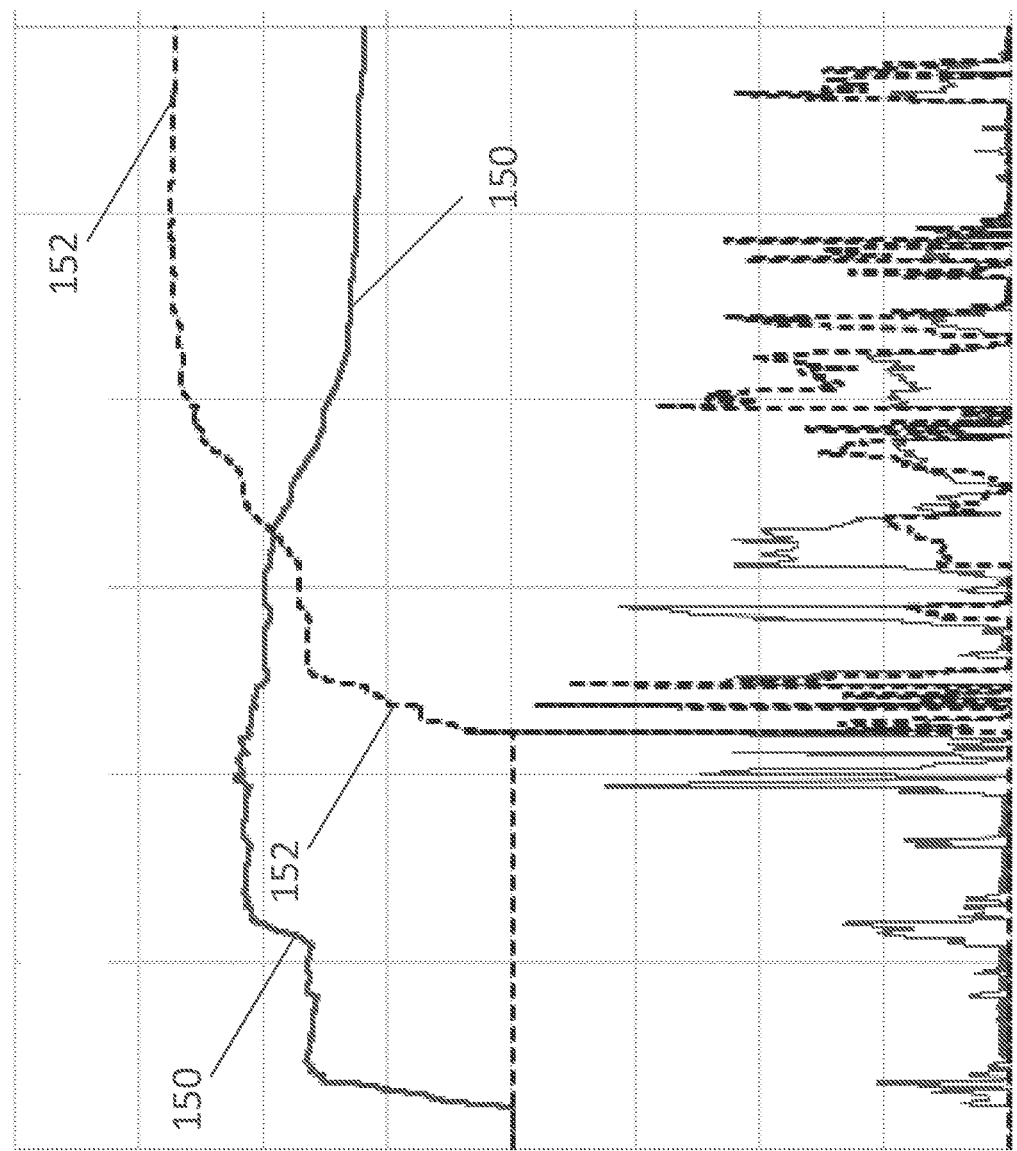
FIG. 3 illustrates additional results of experimental testing of a heavy-duty vehicle including a diesel engine and the exhaust after-treatment system of FIG. 1.

FIG. 3 illustrates results of experimental testing of a heavy-duty vehicle including a diesel engine and the exhaust after-treatment system 100. In particular, FIG. 3 illustrates two charts, one on top of the other. In the bottom of the two charts, the horizontal X-axis represents time and the vertical Y-axis represents the instantaneous rates of DEF dosing, in units of grams per hour, by the first DEF injector 110 and the second DEF injector 124. In the top of the two charts, the horizontal X-axis represents time on the same scale and interval as in the bottom of the two charts, and the vertical Y-axis represents the cumulative ammonia-to-$NO_x$ ratio resulting (e.g., from ammonia released by the DEF injected by the respective DEF injectors) in the close-coupled SCR system 116 (see the line indicated by reference numeral 150) and in the underbody SCR system 126 (see the line indicated by reference numeral 152).

As illustrated in FIG. 3, the DEF dosing by the first DEF injector 110 and the cumulative ammonia-to-$NO_x$ ratio resulting in the close-coupled SCR system rise quickly early in the testing, reflecting the fact that it is generally more efficient to reduce $NO_x$ levels near start-up or at cold temperatures at the close-coupled SCR 116 than at the underbody SCR 126. As also illustrated in FIG. 3, the DEF dosing by the first DEF injector 110 and the cumulative ammonia-to-$NO_x$ ratio resulting in the close-coupled SCR system 116 fall, and the DEF dosing by the second DEF injector 124 and the cumulative ammonia-to-$NO_x$ ratio resulting in the underbody SCR system 126 rise quickly, later in the testing, reflecting the fact that it is generally advantageous to reduce $NO_x$ levels near steady-state operation or at hot temperatures at the underbody SCR 126 than at the close-coupled SCR 116.

Figure 4:
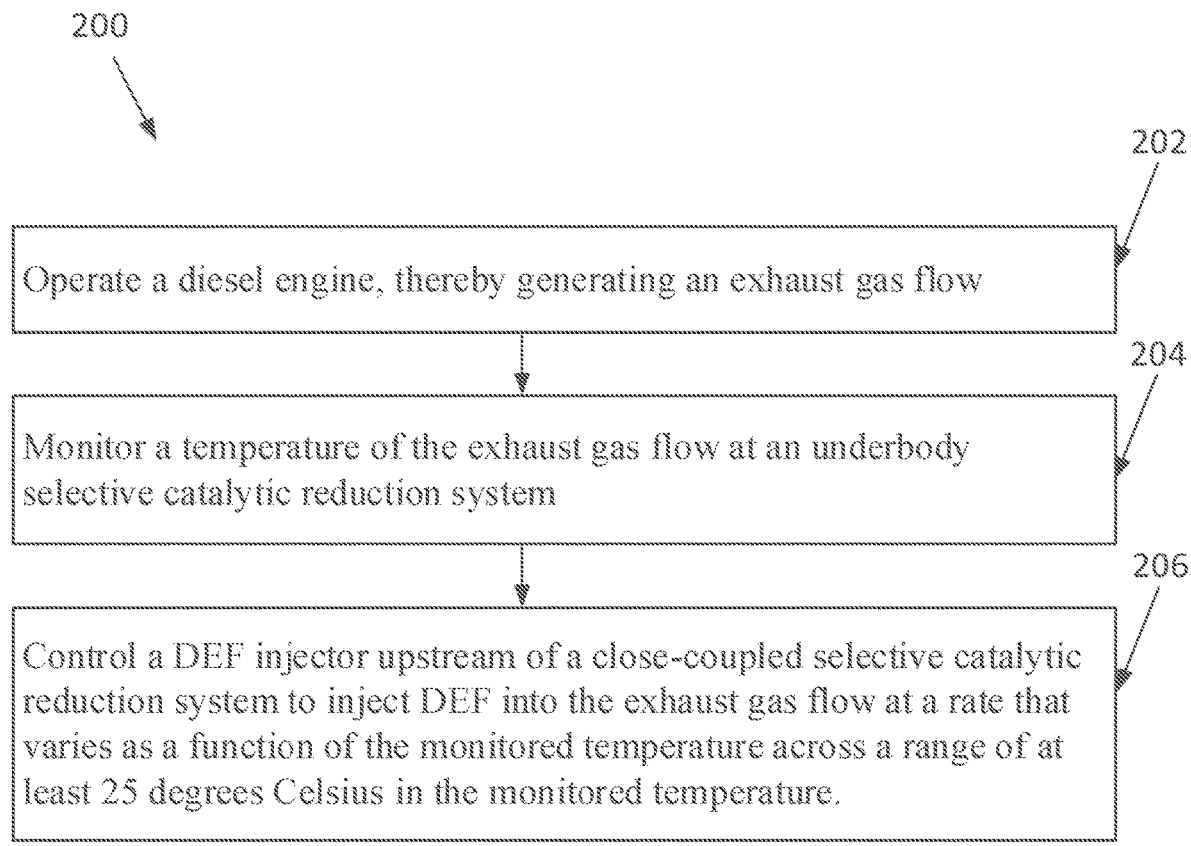
FIG. 4 illustrates a flow chart of a method of using the systems described herein.

FIG. 4 illustrates a flow chart 200 of a summarized version of a method in accordance with the present disclosure. As illustrated in FIG. 4, the method includes, at 202, operating a diesel engine, thereby generating an exhaust gas flow. The method further includes, at 204, monitoring a temperature of the exhaust gas flow at an underbody selective catalytic reduction system, and at 206, controlling a DEF injector upstream of a close-coupled selective catalytic reduction system to inject DEF into the exhaust gas flow at a rate that varies as a function of the monitored temperature across a range of at least 25 degrees Celsius in the monitored temperature.

In other embodiments, the exhaust after-treatment system 100 may include three, four, or any other number of independent SCR systems, together with respective DEF injectors, heaters, temperature sensors, and/or $NO_x$ sensors. Each upstream-downstream pair of the SCR systems and respective DEF injectors, heaters, temperature sensors, and/or $NO_x$ sensors can have features corresponding to those described herein for the upstream close-coupled SCR system 116 and the downstream underbody SCR system 126 and their respective DEF injectors, heaters, temperature sensors, and/or $NO_x$ sensors.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
operating a diesel engine of a heavy-duty truck such that the diesel engine generates an exhaust gas flow that enters an exhaust after-treatment system of the heavy-duty truck, the exhaust after-treatment system including a first selective catalytic reduction system and a second selective catalytic reduction system downstream of the first selective catalytic reduction system with respect to the exhaust gas flow;
monitoring a temperature of the exhaust gas flow at the second selective catalytic reduction system;
controlling a DEF injector upstream of the first selective catalytic reduction system to inject DEF into the exhaust gas flow at a rate that varies as a function of the monitored temperature; and
controlling a DEF injector downstream of the first selective catalytic reduction system and upstream of the second selective catalytic reduction system to inject DEF into the exhaust gas flow at a rate that varies as a function of the monitored temperature,
wherein controlling the DEF injector upstream of the first selective catalytic reduction system and controlling the DEF injector downstream of the first selective catalytic reduction system and upstream of the second selective catalytic reduction system includes varying a division of labor of reducing $NO_x$ levels between the first selective catalytic reduction system and the second selective catalytic reduction system as a function of the monitored temperature.

2. The method of claim 1 wherein controlling the DEF injector upstream of the first selective catalytic reduction system includes controlling the DEF injector upstream of the first selective catalytic reduction system to inject DEF into the exhaust gas flow at a rate that varies as a function of the monitored temperature over a span of time of at least one minute.

3. The method of claim 1 wherein controlling the DEF injector upstream of the first selective catalytic reduction system includes controlling the DEF injector upstream of the first selective catalytic reduction system to inject DEF into the exhaust gas flow at a rate that varies as a function of the monitored temperature over a span of time of at least two minutes.

4. The method of claim 1 wherein controlling the DEF injector downstream of the first selective catalytic reduction system and upstream of the second selective catalytic reduction system includes operating the DEF injector downstream of the first selective catalytic reduction system and upstream of the second selective catalytic reduction system to reduce $NO^x$ levels in the exhaust gas flow to ensure compliance with emissions regulations.

5. The method of claim 4 wherein controlling the DEF injector upstream of the first selective catalytic reduction system and controlling the DEF injector downstream of the first selective catalytic reduction system and upstream of the second selective catalytic reduction system includes optimizing the division of labor of reducing $NO_x$ levels to comply with emissions regulations.

6. The method of claim 1 wherein the DEF injector upstream of the first selective catalytic reduction system injects DEF into the exhaust gas flow at a rate that decreases as the monitored temperature increases.

7. The method of claim 1 wherein the DEF injector upstream of the first selective catalytic reduction system initially injects DEF into the exhaust gas flow at a rate sufficient for the first selective catalytic reduction system to reduce $NO^x$ levels to comply with emissions regulations.

8. The method of claim 7 wherein, after the DEF injector upstream of the first selective catalytic reduction system injects DEF into the exhaust gas flow at the rate sufficient for the first selective catalytic reduction system to reduce $NO_x$ levels to comply with emissions regulations, the DEF injector upstream of the first selective catalytic reduction system injects DEF into the exhaust gas flow at a lower rate sufficient for the first selective catalytic reduction system to reduce $NO_x$ levels partway to compliance with emissions regulations.

9. The method of claim 8, further comprising, while the DEF injector upstream of the first selective catalytic reduction system injects DEF into the exhaust gas flow at the rate sufficient for the first selective catalytic reduction system to reduce $NO_x$ levels partway to compliance with emissions regulations, controlling the DEF injector downstream of the first selective catalytic reduction system and upstream of the second selective catalytic reduction system to inject DEF into the exhaust gas flow at a rate sufficient for the second selective catalytic reduction system to reduce $NO_x$ levels to comply with emissions regulations.

10. The method of claim 8 wherein, after the DEF injector upstream of the first selective catalytic reduction system injects DEF into the exhaust gas flow at a rate sufficient for the first selective catalytic reduction system to reduce $NO_x$ levels halfway to compliance with emissions regulations, the DEF injector upstream of the first selective catalytic reduction system ceases to inject DEF into the exhaust gas flow.

11. The method of claim 10, further comprising, once the DEF injector upstream of the first selective catalytic reduction system ceases to inject DEF into the exhaust gas flow, controlling the DEF injector downstream of the first selective catalytic reduction system and upstream of the second selective catalytic reduction system to inject DEF into the exhaust gas flow at a rate sufficient for the second selective catalytic reduction system to reduce $NO_x$ levels to comply with emissions regulations.

12. The method of claim 1, further comprising monitoring a $NO_x$ level upstream of the first selective catalytic reduction system.

13. The method of claim 12 wherein controlling the DEF injector upstream of the first selective catalytic reduction system includes operating the DEF injector to inject DEF into the exhaust gas flow at a rate that varies as a function of the monitored $NO_x$ level.

14. The method of claim 13 wherein controlling the DEF injector upstream of the first selective catalytic reduction system includes operating the DEF injector to inject DEF into the exhaust gas flow to achieve a target ammonia-to-$NO_x$ ratio in the first selective catalytic reduction system.

15. The method of claim 1 wherein the first selective catalytic reduction system is a close-coupled selective catalytic reduction system and the second selective catalytic reduction system is an underbody selective catalytic reduction system.

16. A heavy-duty truck, comprising:
  a diesel engine;
  an exhaust after-treatment system having an upstream end and a downstream end opposite the upstream end, the upstream end coupled to the diesel engine, the exhaust after-treatment system including a first selective catalytic reduction system and a second selective catalytic reduction system downstream of the first selective catalytic reduction system; and
  an engine control unit configured to:
    operate the diesel engine such that the diesel engine generates an exhaust gas flow that enters the exhaust after-treatment system;
    monitor a temperature of the exhaust gas flow at the second selective catalytic reduction system;
    control a DEF injector upstream of the first selective catalytic reduction system to inject DEF into the exhaust gas flow at a rate that varies as a function of the monitored temperature; and
    control a DEF injector downstream of the first selective catalytic reduction system and upstream of the second selective catalytic reduction system to inject DEF into the exhaust gas flow at a rate that varies as a function of the monitored temperature,
  wherein controlling the DEF injector upstream of the first selective catalytic reduction system and controlling the DEF injector downstream of the first selective catalytic reduction system and upstream of the second selective catalytic reduction system includes varying a division of labor of reducing $NO_x$ levels between the first selective catalytic reduction system and the second selective catalytic reduction system as a function of the monitored temperature.

17. The heavy-duty truck of claim 16 wherein the engine control unit is configured to control the DEF injector upstream of the first selective catalytic reduction system to inject DEF into the exhaust gas flow to achieve a target ammonia-to-$NO_x$ ratio in the first selective catalytic reduction system.

18. The heavy-duty truck of claim 16 wherein the first selective catalytic reduction system is a close-coupled selective catalytic reduction system and the second selective catalytic reduction system is an underbody selective catalytic reduction system.

* * * * *